US006193424B1

(12) United States Patent
Ogiso

(10) Patent No.: US 6,193,424 B1
(45) Date of Patent: Feb. 27, 2001

(54) APPARATUS AND METHOD FOR AUTOMATICALLY DILUTING CONCENTRATED REPLENISHERS AND LIQUID LEVEL CONTROL APPARATUS

(75) Inventor: Takashi Ogiso, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/376,341

(22) Filed: Aug. 18, 1999

(30) Foreign Application Priority Data

Aug. 19, 1998 (JP) .................................................. 10-233239
Jun. 8, 1999 (JP) .................................................. 11-161316

(51) Int. Cl.[7] .......................... G03D 13/00; G08B 21/00; G01F 23/00

(52) U.S. Cl. ......................... 396/578; 396/626; 73/304 R; 340/620; 340/618; 324/665

(58) Field of Search .................................... 396/578, 626; 137/3; 366/142; 324/665, 696; 73/304 C, 304 R; 429/92; 340/618, 620

(56) References Cited

U.S. PATENT DOCUMENTS 4,027,534 * 6/1977 Zimmerman ........................ 73/304 R
4,151,854 * 5/1979 Patsko ...................................... 137/3
4,165,186 * 8/1979 Tortorich et al. .................... 366/142
5,353,085 * 10/1994 Kurematsu et al. ................. 396/626
5,408,223 * 4/1995 Guillemot ............................ 340/620
5,640,643 * 6/1997 Hoitz et al. .......................... 396/661
5,797,057 * 8/1998 Kinoshita et al. ................... 396/578
5,930,550 * 7/1999 Tanaka ................................ 396/627

FOREIGN PATENT DOCUMENTS 10-115903 5/1998 (JP) ................................ G03D/3/06

* cited by examiner

*Primary Examiner*—D. Rutledge
(74) *Attorney, Agent, or Firm*—Sughrue, Mion, Zinn, Macpeak & Seas, PLLC

(57) ABSTRACT

Provided is a concentrated replenisher automatic diluting apparatus and method that can easily and accurately dilute concentrated replenishers and that can set the amount of agents included in the replenishers supplied to processing tanks to ideal values in a system where a variety of concentrated replenishers are supplied from a processing agent kit at the same time and the concentrated replenishers are diluted. When a liquid level detector of one of replenisher tanks detects that a replenisher held in the replenisher tank has reached a lower limit level, predetermined amounts of different kinds of concentrated replenishers are supplied to the replenisher tanks from a replenishing agent kit. Water is supplied to the replenisher tanks through a wash pump and a wash valve in order to dilute the concentrated replenishers. The supply of the water to the replenisher tanks is stopped when the liquid level detectors of the replenisher tanks detect that the replenishers held in the replenisher tanks have reached upper limit levels.

36 Claims, 7 Drawing Sheets

P1R P2RA P2RB

① DETECT LOWER LIMIT (SUPPLEMENTARY AMOUNT IS LARGE) (SUPPLEMENTARY AMOUNT IS SMALL)

FIG. 7 (A)

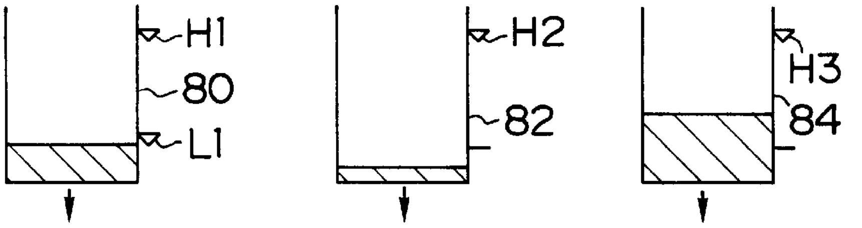

② OPEN BOTTLES

FIG. 7 (B)

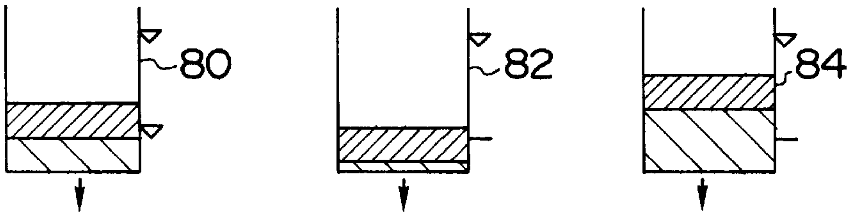

③ SUPPLY WATER TO UPPER LIMIT LEVELS

FIG. 7 (C)

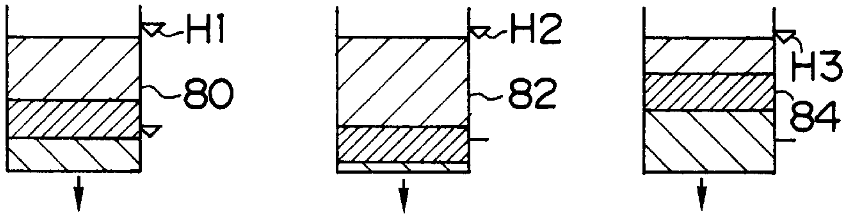

④ IF SUPPLIED AMOUNT IS LARGER THAN IDEAL VALUE, THIN REPLENISHER IS PRODUCED. IF SUPPLIED AMOUNT IS SMALLER THAN IDEAL VALUE, THICK REPLENISHER IS PRODUCED.

FIG. 7 (D)

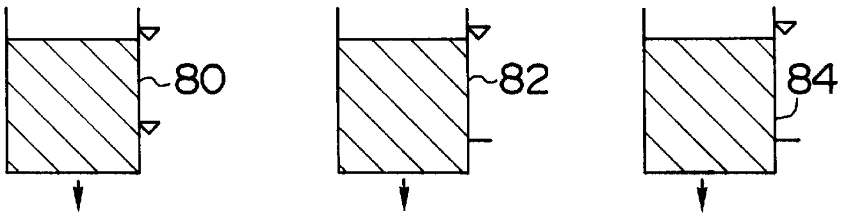

⑤ LARGE AMOUNT OF THIN REPLENISHER AND SMALL AMOUNT OF THICK REPLENISHER ARE SUPPLIED

FIG. 7 (E)

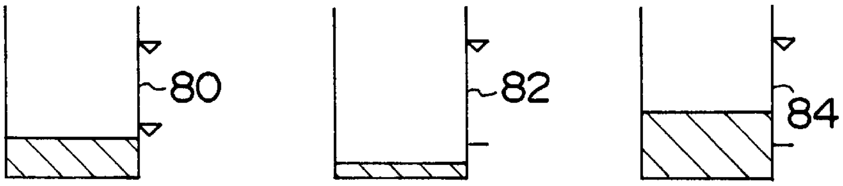

APPARATUS AND METHOD FOR AUTOMATICALLY DILUTING CONCENTRATED REPLENISHERS AND LIQUID LEVEL CONTROL APPARATUS

BACKGROUND OF THE INVENTION

1. Field of the Invention

The present invention relates generally to an apparatus and method for automatically diluting concentrated replenishers and a liquid level control apparatus, and more particularly to an apparatus and method for automatically diluting concentrated replenishers to prepare replenishers having desired concentrations, and a liquid level control apparatus for controlling the liquid levels of the replenishers and the like.

2. Description of Related Art

A variety of photosensitive material processing apparatuses have already been proposed, which dilute concentrated replenishing solutions or replenishers in replenisher tanks to prepare replenishers, which are supplied to processing tanks (e.g., Japanese Patent Provisional Publication No. 10-115903). The concentrated replenisher is bottled or the like at a manufacturing plant, and the quantity thereof is accurately controlled. In order to prepare a proper replenisher by diluting the concentrated replenisher, it is necessary to accurately control the quantity of a diluting solution in the photosensitive material processing apparatus.

Accordingly, the conventional apparatus precisely feedback-controls the quantity of the diluting solution for diluting the concentrated replenisher. The feedback control, however, is complicated and increases the cost of the system.

In a system that supplies a variety of concentrated replenishers at the same time by means of a processing agent kit having a plurality of cartridges or bottles filled with the concentrated replenishers (e.g., a concentrated developing solution and a concentrated fixing solution) required for the photosensitive material processing apparatus; it is necessary to use up the replenishers at the same time. It is difficult to control the photosensitive material processing apparatus in such a way as to use up the replenishers at the same time.

If the replenishers are not used up at the same time, when one of the bottles in the processing agent kit becomes empty, the processing agent kit still holding the replenishers in the other bottles can be thrown away. This, however, is undesirable in order to reduce industrial wastes.

SUMMARY OF THE INVENTION

In view of the foregoing, it is an object of the present invention to provide a concentrated replenisher automatic diluting apparatus and method that can easily and accurately dilute concentrated replenishers and that can set the amount of agents included in the replenishers supplied to processing tanks to ideal values in a system where a variety of concentrated replenishers are supplied from a processing agent kit at the same time and the concentrated replenishers are diluted.

It is another object of the present invention to provide a liquid level control apparatus that prevents the overflow of the replenishers when a liquid level detector goes wrong.

To achieve the above-mentioned object, the present invention is directed to a concentrated replenisher automatic diluting apparatus in a photosensitive material processing system, comprising: a container holding a replenisher supplied to a photosensitive material processing tank; a first liquid level detector provided in the container to detect that a liquid level of the replenisher held in the container has reached a lower limit level; a second liquid level detector provided in the container to detect that the liquid level of the replenisher held in the container has reached an upper limit level; a first supplier which supplies a concentrated replenisher to the container; a second supplier which supplies a diluting solution to the container; and a controller which controls the first and second suppliers; wherein a supply of a predetermined amount of the concentrated replenisher to the container and a supply of the diluting solution to the container are started in accordance with a detection of the lower limit level of the replenisher held in the container by the first liquid level detector, and the supply of the diluting solution to the container is stopped in accordance with a detection of the upper limit level of the replenisher held in the container by the second liquid level detector.

According to the present invention, when the liquid level of the replenisher held in the container reaches the lower limit level, the predetermined amount of the concentrated replenisher and the diluting solution are supplied to the container. The diluting solution is supplied even after the predetermined amount of the concentrated replenisher is supplied to the container. When the liquid level of the replenisher held in the container reaches the upper limit level, the supply of the diluting solution is stopped. Consequently, an appropriate amount of the diluting solution can be added to the predetermined amount of the concentrated replenisher.

The present invention is also directed to a concentrated replenisher automatic diluting apparatus in a photosensitive material processing system, comprising: a plurality of containers, each of which holds each of different kinds of replenishers supplied to corresponding each of photosensitive material processing tanks; a first liquid level detector provided in at least one of the plurality of containers to detect that a liquid level of the replenisher held in the one of the plurality of containers has reached a lower limit level; a plurality of second liquid level detectors, each of which is provided in each of the plurality of containers to detect that each liquid level of each replenisher held in each container has reached each upper limit level; a first supplier which supplies each of different kinds of concentrated replenishers to each of the plurality of containers; a second supplier which supplies a diluting solution to each of the plurality of containers; and a controller which controls the first and second suppliers; wherein each supply of each predetermined amount of each of different kinds of concentrated replenishers to each of the plurality of containers and each supply of the diluting solution to each of the plurality of containers are started in accordance with a detection of the lower limit level of the replenisher held in the one of the plurality of containers by the first liquid level detector, and each supply of the diluting solution to each of the plurality of containers is stopped in accordance with each detection of each upper limit level of each replenisher held in each container by each of the plurality of second liquid level detectors.

According to the present invention, the replenisher in one of the containers in which the liquid level is detected as having reached to the lower limit level is prepared in the same manner as described above. On the other hand, the replenishers in the other containers are prepared in synchronism with the preparation of the replenisher in the one of the containers. Specifically, when the liquid level of the replenisher in the one of the containers reaches the lower limit level, the supply of the concentrated replenishers and the diluting solution is started with respect to all the containers. The replenishers in the containers are supplied to the processing tanks by independent replenishing pumps, and thus, the replenishing amount varies with the processing tanks. A thicker replenisher is prepared in a container from which a smaller amount of the replenisher is supplied (i.e., the container with a larger residual amount of the replenisher). On the other hand, a thinner replenisher is prepared in a container from which a larger amount of the replenisher is supplied (i.e., the container with a smaller residual amount of the replenisher). Consequently, the amount of agent included in the replenisher supplied to the processing tank can be settled at an ideal value.

Preferably, the supply of the predetermined amount of the concentrated replenisher to the container and the supply of the diluting solution to the container are started at the detection of the lower limit level of the replenisher held in the container by the first liquid level detector or after a predetermined waiting period from the detection of the lower limit level of the replenisher held in the container by the first liquid level detector; and the supply of the diluting solution to the container is stopped at the detection of the upper limit level of the replenisher held in the container by the second liquid level detector or after a predetermined waiting period from the detection of the upper limit level of the replenisher held in the container by the second liquid level detector.

Preferably, the first and second liquid level detectors are included in one liquid level detecting device. The liquid level detecting device comprises a conductive resin electrode which is constructed in such a way that two parts of two electric wires covered with an insulator are partially exposed as two electrodes, respectively, and the electric wires including the two electrodes are coated with a conductive resin for protecting the two electrodes from the replenisher; and the liquid level detecting device detects the lower and upper limit levels of the replenisher in accordance with an electric current flowing between the two electrodes of the conductive resin electrode.

The present invention is also directed to a concentrated replenisher automatic diluting method, comprising the steps of: detecting that a liquid level of a replenisher held in a container has reached a lower limit level; supplying a predetermined amount of a concentrated replenisher from a concentrated replenisher cartridge to the container when the liquid level is detected as being the lower limit level; starting a supply of a diluting solution to the container when the liquid level is detected as being the lower limit level; detecting that the liquid level of the replenisher held in the container has reached an upper limit level; and stopping the supply of the diluting solution when the liquid level is detected as being the upper limit level; wherein the replenisher is supplied to a photosensitive material processing tank in a photosensitive material processing system.

The present invention is also directed to a concentrated replenisher automatic diluting method, comprising the steps of: detecting that a liquid level of a replenisher held in a container has reached a lower limit level; starting a supply of a diluting solution to the container when the liquid level is detected as being the lower limit level; detecting that the liquid level of the replenisher held in the container has reached an upper limit level; stopping the supply of the diluting solution when the liquid level is detected as being the upper limit level; and supplying a predetermined amount of a concentrated replenisher from a concentrated replenisher cartridge to the container after the stopping step; wherein the replenisher is supplied to a photosensitive material processing tank in a photosensitive material processing system.

The present invention is also directed to a concentrated replenisher automatic diluting method, comprising the steps of: detecting that at least one of liquid levels of different kinds of replenishers held in a plurality of containers has reached a lower limit level; supplying each predetermined amount of each of different kinds of concentrated replenishers from each of concentrated replenisher cartridges to each of the plurality of containers when the at least one of liquid levels is detected as being the lower limit level; starting each supply of a diluting solution to each of the plurality of containers when the at least one of liquid levels is detected as being the lower limit level; detecting that each liquid level of each replenisher held in each container has reached each upper limit level; and stopping each supply of the diluting solution to each of the plurality of containers when each liquid level is detected as being each upper limit level; wherein each of the replenishers is supplied to corresponding each of photosensitive material processing tanks in a photosensitive material processing system.

The present invention is also directed to a concentrated replenisher automatic diluting method, comprising the steps of: detecting that at least one of liquid levels of different kinds of replenishers held in a plurality of containers has reached a lower limit level; starting each supply of a diluting solution to each of the plurality of containers when the at least one of liquid levels is detected as being the lower limit level; detecting that each liquid level of each replenisher held in each container has reached each upper limit level; and stopping each supply of the diluting solution to each of the plurality of containers when each liquid level is detected as being each upper limit level; and supplying each predetermined amount of each of different kinds of concentrated replenishers from each of concentrated replenisher cartridges to each of the plurality of containers after the stopping step; wherein each of the replenishers is supplied to corresponding each of photosensitive material processing tanks in a photosensitive material processing system.

Preferably, only the liquid level of the replenisher that requires the highest diluting accuracy among the different kinds of replenishers is detected in the former detecting step. Alternatively, the liquid level of the replenisher that has reached the lower limit level first among the different kinds of replenishers may be detected in the former detecting step.

The diluting solution is supplied to the containers after the supply of the predetermined amounts of the concentrated replenishers is completed. If a period from a start to a completion of the supply of the diluting solution is longer than a period from a start to a completion of the supply of the predetermined amount of the concentrated replenisher, the supply of the diluting solution and the supply of the concentrated replenisher may be started at the same time. Alternatively, the supply of the diluting solution to the containers is suspended after a predetermined amount of the diluting solution is supplied, and the supply of the diluting solution is resumed after the predetermined amounts of the concentrated replenishers are supplied.

The present invention is also directed to a liquid level control apparatus, comprising: a first liquid level detector with which the liquid level control apparatus controls a liquid level; and a second liquid level detector provided at a different position from the first liquid level detector; wherein the liquid level control apparatus controls the liquid level by means of the second liquid level detector when the first liquid level detector goes wrong.

Preferably, the second liquid level detector is provided as a safe liquid level detector at a part into which overflow from a plurality of containers collects, and detects a malfunction of at least one of liquid level detectors provided in the plurality of containers. Thus, the second liquid level detector can be used to detect the malfunction of the liquid level detectors provided in the plurality of containers.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIGS. 7(A)–7(E) are explanation drawings showing the process for automatically preparing the replenishers.

DETAILED DESCRIPTION OF THE PREFERRED EMBODIMENT

This invention will be described in further detail by way of example with reference to the accompanying drawings.

Figure 1:
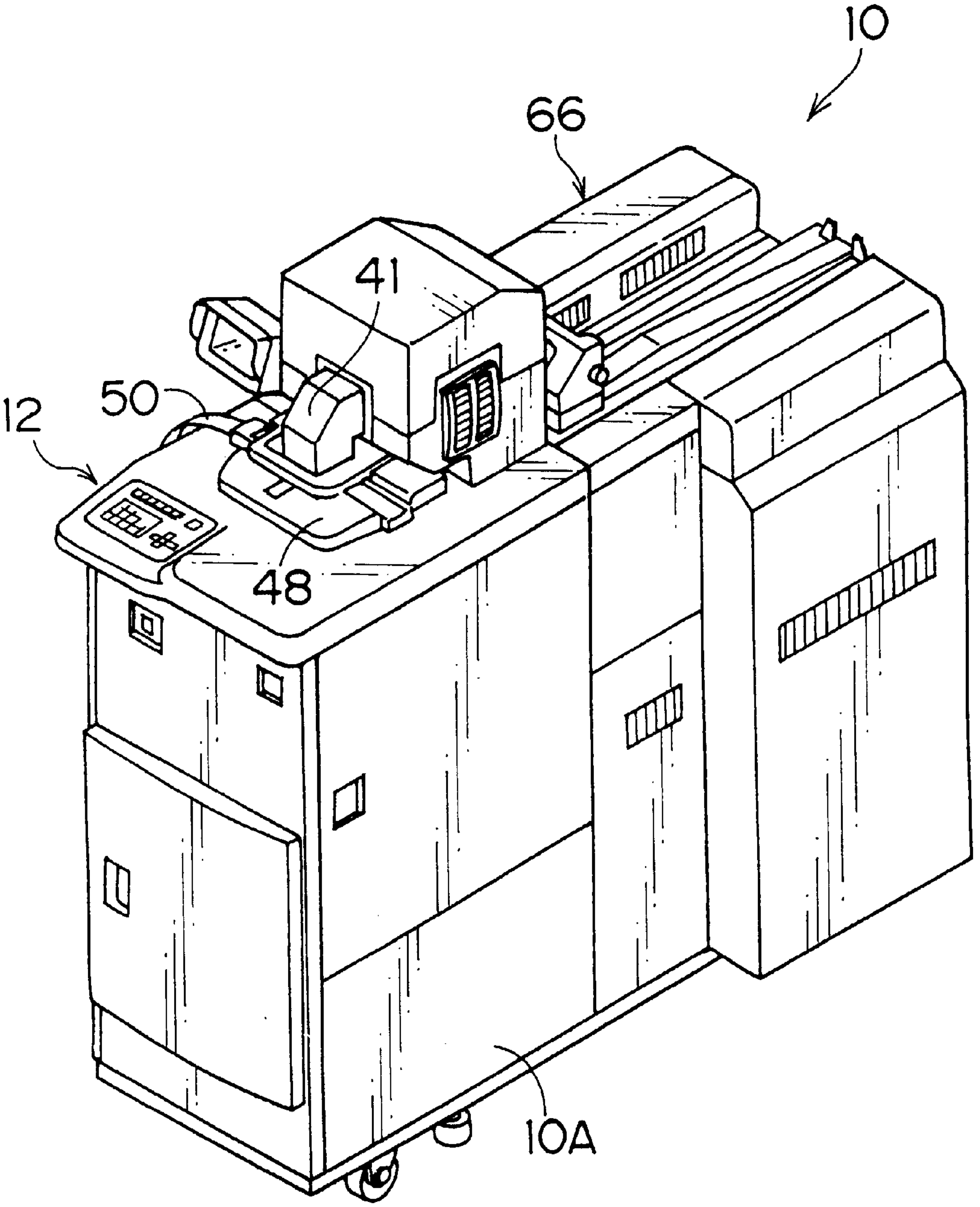
FIG. 1 is a perspective view showing the appearance of a photosensitive material processing apparatus according to an embodiment of the present invention.
Figure 2:
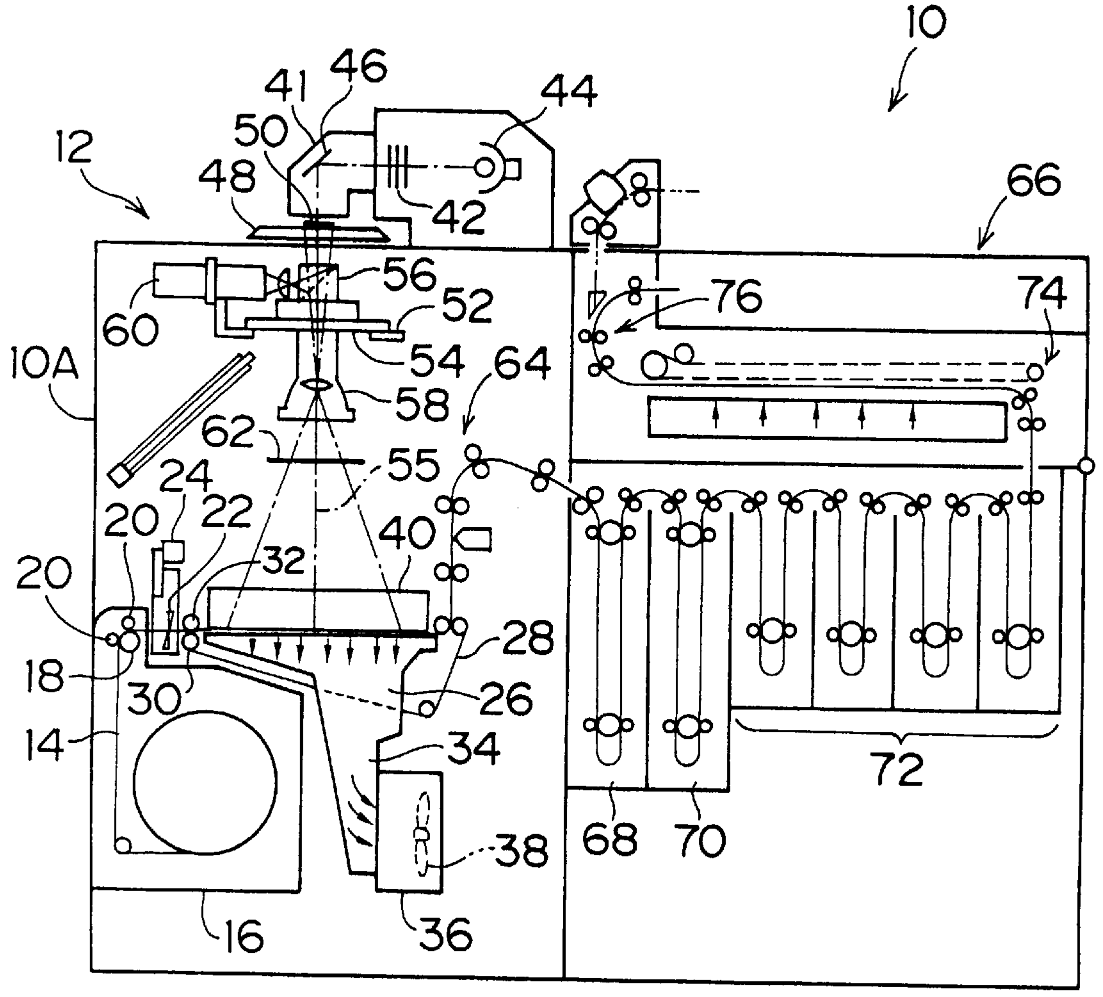
FIG. 2 is a view showing the inner structure of the photosensitive material processing apparatus in FIG. 1.

FIG. 1 is a perspective view showing the appearance of a photosensitive material processing apparatus 10 according to an embodiment of the present invention, and FIG. 2 is a view showing the inner structure of the photosensitive material processing apparatus 10.

As shown in FIG. 2, the photosensitive material processing apparatus 10 comprises a printer part including a photograph printing station 12 and a processing station 66. A paper magazine 16 containing printing paper 14 as a photosensitive material is mounted in the photograph printing station 12. A drive roller 18 and a pair of nip rollers 20 are provided at the upper left of the paper magazine 16 in FIG. 2. The printing paper 14 contained in the paper magazine 16 is pinched and fed toward the photograph printing station 12 by the drive roller 18 and the nip rollers 20.

A cutter 22 having a pair of upper and lower edges is arranged at the right side of the drive roller 18 in FIG. 2. The printing paper 14 goes between the upper and lower edges of the cutter 22. A motor 24 moves the pair of edges of the cutter 22 in such a manner that they can become closer to or farther from each other. When the pair of edges of the cutter 22 becomes closer to each other, they cut the printing paper 14.

A supporting base 26 is disposed at the right side of the cutter 22 in FIG. 2, and the supporting base 26 has a horizontal top surface. A winding roller 30, on which an endless belt 28 is wound, and a nip roller 32, which nips the endless belt 28 between the nip roller 32 and the winding roller 30, are disposed between the supporting base 26 and the cutter 22.

A number of small holes (not shown) are formed all over the endless belt 28, and a number of small holes (not shown) are also formed at the top surface of the supporting base 26, on which the endless belt 28 is partially placed. The supporting base 26 has a cavity, and the bottom of the supporting base 26 connects to a fan box 36 through a pair of ducts 34 (only one duct is shown). If a fan 38 of the fan box 36 is run to suck in the air in the cavity of the supporting base 26, the printing paper 14 is held by suction on the top surface of the supporting base 26 through the endless belt 28.

An easel device 40 is disposed above the endless belt 28, which moves along the supporting base 26. A diffusion box 41 for diffusing light is placed above the easel device 40. As shown in FIGS. 1 and 2, the diffusion box 41 is located above a casing 10A, which composes the outer frame of the photosensitive material processing apparatus 10. A CC filter 42 is arranged adjacent to the diffusion box 41. The CC filter 42 comprises three movable filters of cyan, magenta and yellow, which are inserted into the optical path. A light source 44 is provided adjacent to the CC filter 42. Thus, a light emitted from the light source 44 passes through the CC filter 42 and is diffused at the diffusion box 41. The light is downwardly reflected by a reflection mirror 46 in the diffusion box 41. Consequently, the light illuminates a negative film 50 on a negative carrier 48, which is located below the diffusion box 41.

A supporting plate 54 is supported on a guide rail 52 in the photograph printing station 12, and the supporting plate 54 is movable horizontally (perpendicularly to the drawing). A prism 56 and a zoom lens 58 are mounted to the supporting plate 54, and both the prism 56 and the zoom lens 58 are arranged on the optical path 55 of the above-mentioned light. The light passes through the negative film 50 to become exposure light. The exposure light is transmitted through the prism 56 and the zoom lens 58, whose magnification can be changed, and illuminates the printing paper 14 located below the easel device 40. Consequently, the image on the negative film 50 is formed on the printing paper 14, and the image is printed on the printing paper 14.

A density measuring device 60 for measuring the density of the negative film 50 is arranged in the photograph printing station 12. The density measuring device 60 connects to a controller (not shown), and an exposure correction value for the printing exposure is set on the basis of data obtained by the density measuring device 60 and data entered through keys of the controller by an operator. A black shutter 62 for adjusting the printing exposure time is provided on the optical path 55 between the zoom lens 58 and the easel device 40.

The printing paper 14 printed and exposed at the photograph printing station 12 is transferred to the processing station 66 by multiple rollers of a roller group 64 disposed at the latter stage of the supporting base 26. The processing station 66 performs developing, fixing, washing and drying for the printing paper 14.

The processing station 66 has a developing tank 68, a fixing tank 70 and a wash tank 72 as processing tanks. A developing solution, a fixing solution and water are held in the developing tank 68, the fixing tank 70 and the wash tank 72, respectively. The exposed and printed printing paper 14 is developed by the developing solution while passing through the developing tank 68. Then, the printing paper 14 is fixed while passing through the fixing tank 70, and it is washed by water while passing through the wash tank 72.

The washed printing paper 14 is transferred to a drying station 74, which is located above the wash tank 72. The printing paper 14 is dried by hot air while passing through the drying station 74. The dried printing paper 14 is pinched between multiple pairs of rollers 76, and is ejected from the photosensitive material processing apparatus 10. The ejected sheets of the printing paper 14 are piled up on a tray (not shown). The photosensitive material processing apparatus 10 thus finishes processing the printing paper 14.

Figure 3:
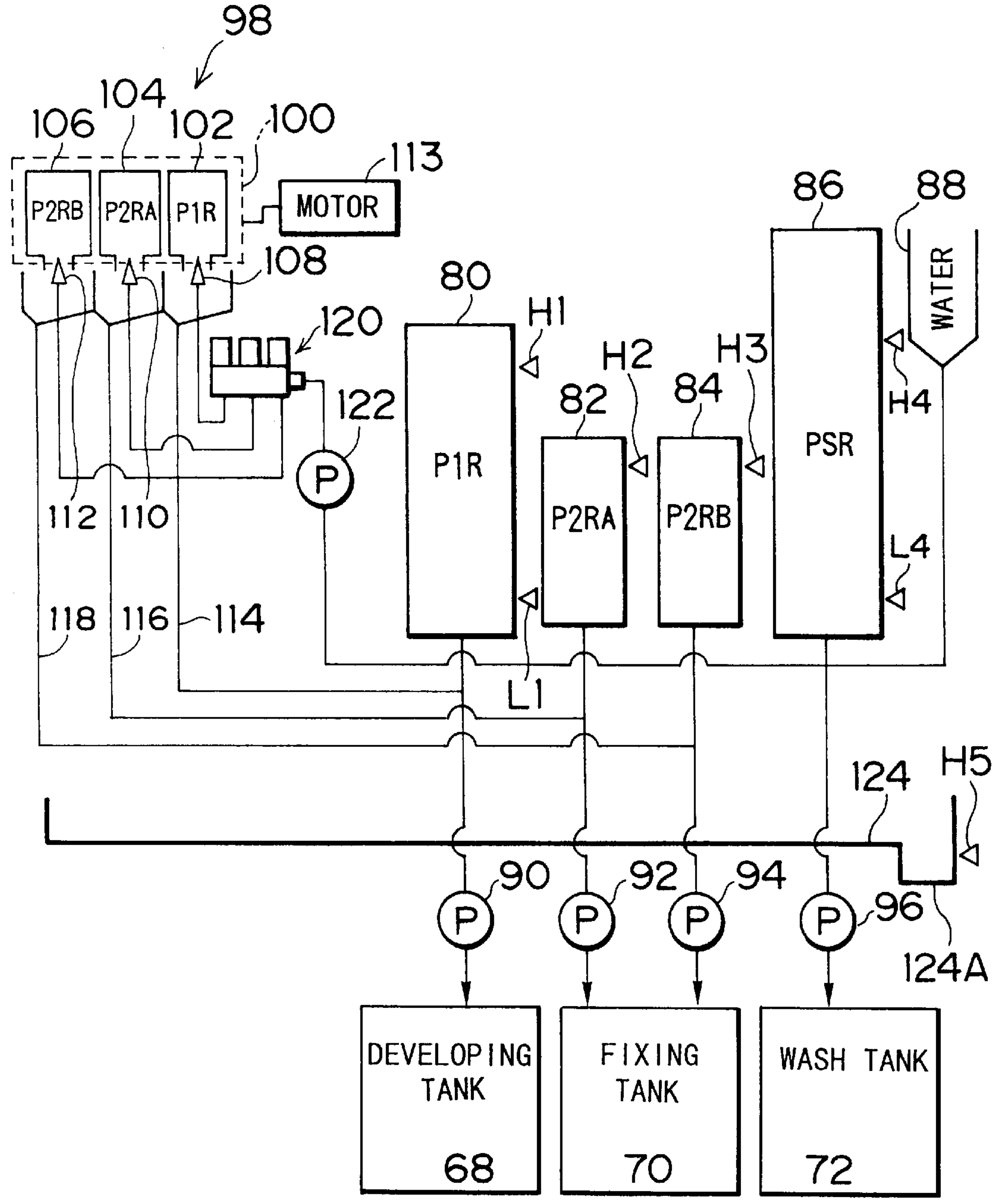
FIG. 3 is a view showing the paths along which replenishers are supplied to processing tanks, and an automatic diluting apparatus for preparing the replenishers.

FIG. 3 shows the paths of a replenisher P1R for the developing solution, replenishers P2RA and P2RB for the fixing solution, and a replenishing water for the water PSR, which are supplied to the developing tank 68, the fixing tank 70 and the wash tank 72, respectively. FIG. 3 also shows a dilution apparatus for preparing the replenishers P1R, P2RA and P2RB.

As shown in FIG. 3, the replenishers P1R, P2RA and P2RB and the water PSR are held in four replenisher tanks 80, 82, 84 and 86. Running separately-provided replenishing pumps (e.g., bellows pumps) 90, 92, 94 and 96 supplies the replenishers P1R, P2RA and P2RB and the water PSR to the developing tank 68, the fixing tank 70 and the wash tank 72. The replenishers P2RA and P2RB are mixed and supplied to the fixing tank 70.

If the replenishers P1R, P2RA and P2RB are in short supply, concentrated replenishers are diluted with a diluting solution (the water PSR in the replenisher tank 86 in this embodiment) in order to automatically prepare the replenishers P1R, P2RA and P2RB.

More specifically, a replenishing agent kit 100 is set in a replenishing part 98 in advance. The replenishing agent kit 100 comprises three bottles 102, 104 and 106, which hold predetermined amounts of the concentrated replenishers of the replenishers P1R, P2RA and P2RB, respectively. The bottles 102, 104 and 106 are housed in a case. The openings of the bottles 102, 104 and 106 are covered with seal materials. The bottles 102, 104 and 106 can be opened by pressing the seal materials with a predetermined force.

On the other hand, nozzles 108, 110 and 112 are provided to face the openings of the bottles 102, 104 and 106 in the replenishing part 98. When the replenishing agent kit 100 is lowered by a bottle opening drive motor 113 for moving up and down the replenishing agent kit 100, the bottles 102, 104 and 106 are automatically opened by the nozzles 108, 110 and 112. Then, the concentrated replenishers in the bottles 102, 104 and 106 are supplied to the replenisher tanks 80, 82 and 84 through pipes 114, 116 and 118.

The nozzles 108, 110 and 112 connect to the replenisher tank 86, which holds the water PSR, through a wash valve 120 and a wash pump 122. The nozzles 108, 110 and 112 spray the water PSR in association with the route switching action and the opening/closing actions of the wash valve 120. The water PSR cleans the inside of the bottles 102, 104 and 106. Thereafter, the nozzles 108, 110 and 112 continue spraying the water PSR, with which the concentrated replenishers in the replenisher tanks 80, 82 and 84 are diluted. The washing and diluting actions will be described in further detail later.

The replenisher tank 80 has two liquid level detectors for detecting the lower limit level L1 and the upper limit level H1 of the replenisher P1R. The replenisher tanks 82 and 84 have liquid level detectors for detecting the upper limit levels H2 and H3 of the replenishers P2RA and P2RB, respectively. The replenisher tank 86 has two liquid level detectors for detecting the lower limit level L4 and the upper limit level H4 of the water PSR.

If the solutions overflow from the replenisher tanks 80, 82, 84, 86, or the like due to a malfunction, etc., the overflow solutions collect into a sink 124A of a safe pan 124. The sink 124A has a liquid level detector for detecting the upper limit level H5 of the collecting solutions.

The liquid level detectors of the replenisher tanks 80, 82 and 84 are electrode switches. The electrode switches detect the liquid levels according to whether they contact with the processing solutions or not. The other liquid level detectors are float switches.

Figure 4:
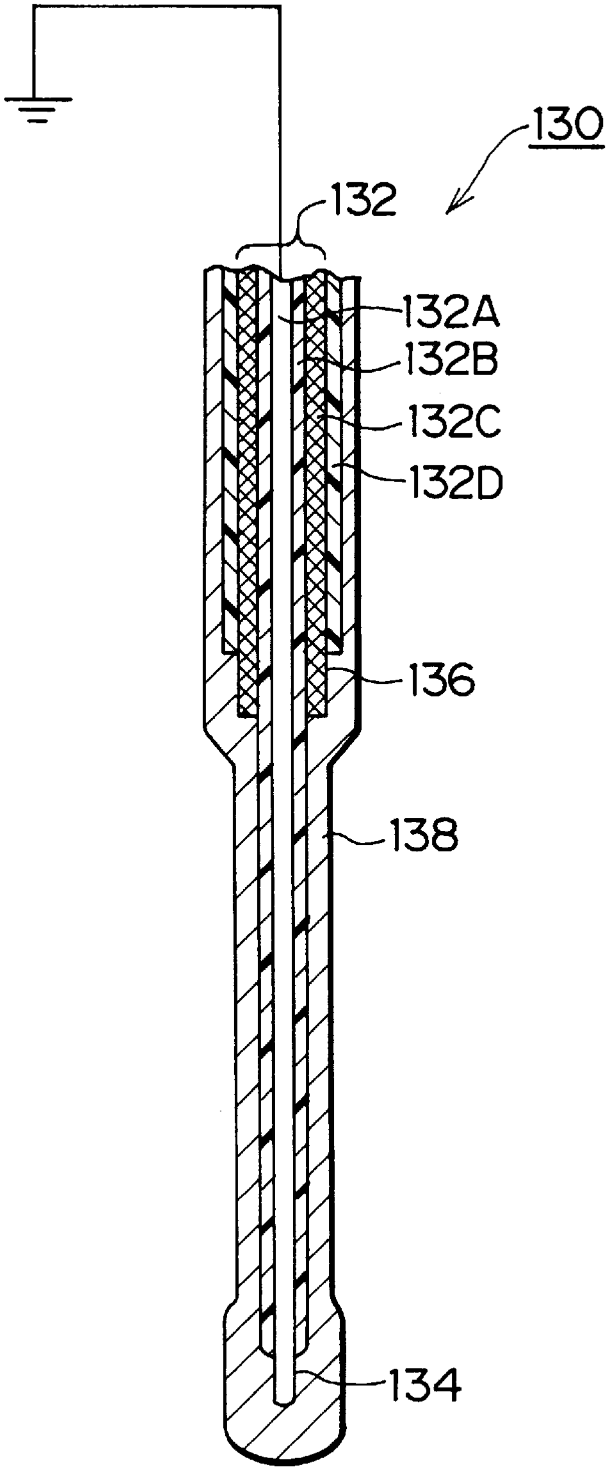
FIG. 4 is a sectional view showing the essential part of an electrode switch, which is used as a liquid level detector for the replenisher in a replenisher tank.

FIG. 4 shows a preferred embodiment of the electrode switch, particularly a conductive resin electrode 130 as a detecting part. The conductive resin electrode 130 is constructed in such a way that a first electrode 134 and a second electrode 136 are exposed from a coaxial cable 132 and are coated with a conductive resin 138.

More specifically, the coaxial cable 132 comprises a core conductor 132A, an insulator 132B covering the core conductor 132A, a meshed metal shield tube 132C covering the insulator 132B, and an insulator 132D covering the shield tube 132C. A portion of the core conductor 132A that is exposed at the end of the coaxial cable 132 is used as the first electrode 134, and a portion of the shield tube 132C that is exposed at a predetermined distance from the first electrode 134 is used as the second electrode 136. The entire coaxial cable 132 including the first electrode 134 and the second electrode 136 is coated with the conductive resin 138. The conductive resin 138 may be any material as long as it is a conductor having suitable resistance, and more preferably, it is made of Teflon® (polytetrafluoroethylene) to which carbon is added. The thickness of the conductive resin 138 is about 0.2 mm, and the conductive resin 138 connects the first electrode 134 and the second electrode 136 with an appropriate resistance.

The conductive resin electrode 130 connects to a detecting circuit (not shown). In this case, the core conductor 132A is grounded, and the shield tube 132C connects to a reference power source used for detecting the liquid level.

A description will now be given of the process for detecting the liquid level by means of the electrode switch. If the liquid level of the processing solution is lower than the first electrode 134, the conductivity between the first electrode 134 and the second electrode 136 is provided with only the conductive resin 138 between the first electrode 134 and the second electrode 136. In this state, only a very small amount of electric current flows between the first electrode 134 and the second electrode 136 due to the relatively-large resistance of the conductive resin 138.

The processing solution for the sensitive material has a substantial conductivity. If the liquid level of the processing solution is higher than the first electrode 134, the electric current flows mainly through the processing solution around the conductive resin electrode 130 without going through the conductive resin 138 at a part that is soaked in the processing solution. In other words, the processing solution around the conductive resin electrode 130 serves as a bypass for the electric current flowing between the first electrode 134 and the second electrode 136. Thus, if the liquid level of the processing solution rises gradually, the resistance between the first electrode 134 and the second electrode 136 gradually decreases and the electric current flowing between the first electrode 134 and the second electrode 136 gradually increases. If the liquid level of the processing solution reaches the second electrode 136, the resistance between the first electrode 134 and the second electrode 136 is the minimum and the electric current flowing between the first electrode 134 and the second electrode 136 is the maximum. It is therefore possible to detect the liquid level of the processing solution in accordance with the electric current flowing between the first electrode 134 and the second electrode 136, which is measured by the detecting circuit.

Figure 5:
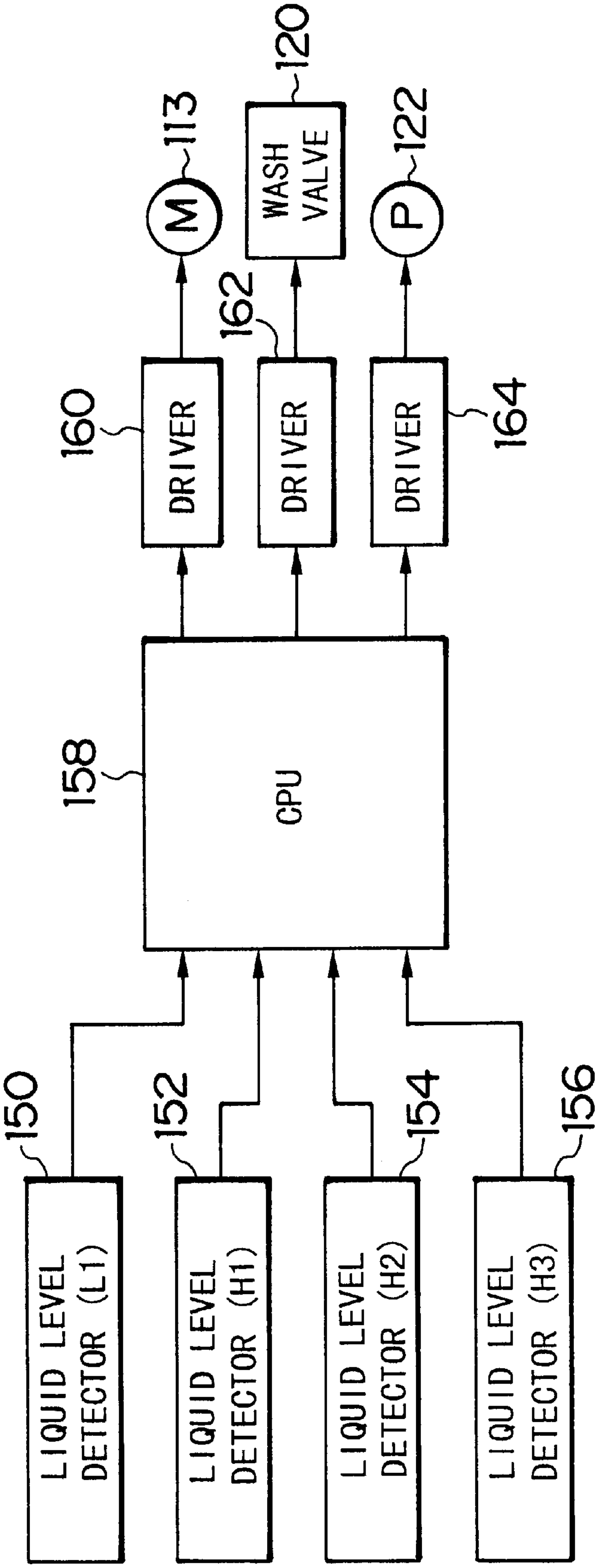
FIG. 5 is a block diagram showing the automatic diluting apparatus according to an embodiment of the present invention.

FIG. 5 is a block diagram showing a preferred embodiment of a concentrated replenisher automatic diluting apparatus according to the present invention.

As shown in FIG. 5, the concentrated replenisher automatic diluting apparatus comprises the bottle opening drive motor 113; the wash valve 120; the wash pump 122; liquid level detectors 150, 152, 154 and 156; and a central processing unit (CPU) 158.

The liquid level detectors 150 and 152 detect the lower limit level L1 and the upper limit level H1, respectively, of the liquid level of the replenisher P1R held in the replenisher tank 80. When the liquid level detectors 150 or 152 detects the lower limit level L1 or the upper limit level H1, it outputs a corresponding detection signal to the CPU 158. Likewise, the liquid level detector 154 detects the upper limit level H2 of the replenisher P2RA held in the replenisher tank 82. When the liquid level detector 154 detects the upper limit level H2, it outputs a corresponding detecting signal to the CPU 158. The liquid level detector 156 detects the upper limit level H3 of the replenisher P2RB held in the replenisher tank 84. When the liquid level detector 156 detects the upper limit level H3, it outputs a corresponding detection signal to the CPU 158.

The CPU 158 supervises the concentrated replenisher automatic diluting apparatus, and controls the bottle opening drive motor 113, the wash valve 120 and the wash pump 122 through drivers 160, 162 and 164 in accordance with the detection signals outputted from the liquid level detectors 150, 152, 154 and 156.

A description will now be given of the operations of the CPU 158 for automatically preparing the replenishers P1R, P2RA and P2RB with reference to the flow chart of FIG. 6 and FIGS. 7(A)–(E) showing the states of the replenishers held in the replenisher tanks. The operations include the bottle washing operation and the concentrated replenisher diluting operation.

FIG. 7(A) shows the state of the replenishers P1R, P2RA and P2RB in the replenisher tanks 80, 82 and 84 when the liquid level detector 150 of the replenisher tank 80 detects the lower limit level L1 of the replenisher P1R.

In this example, a larger amount of the replenisher P2RA will be supplied from the replenisher tank 82 whereas a smaller amount of the replenisher P2RB will be supplied from the replenisher tank 84. More specifically, the amount of the developing solution used for developing the printing paper 14 is about 45 ml/$m^2$, and the amount of the fixing solution for fixing the printing paper 14 is about 35 ml/$m^2$. If the printing paper 14 has been processed to a predetermined extent, the CPU 158 runs the replenishing pumps 90, 92 and 94 to supply the replenishers P1R, P2RA and P2RB to the developing tank 68 and the fixing tank 70. The replenishing pumps 90, 92 and 94 have the same discharge ability of 50 ml per 30 seconds, but the discharge amount of each replenishing pump has an error. Therefore, the replenishing amounts have errors as shown in FIG. 7(A). More specifically, when the liquid level detector 150 of the replenisher tank 80 detects the lower limit level L1 of the replenisher P1R, the residual amounts of the replenishers P2RA and P2RB are different from reference residual amounts.

Figure 6:
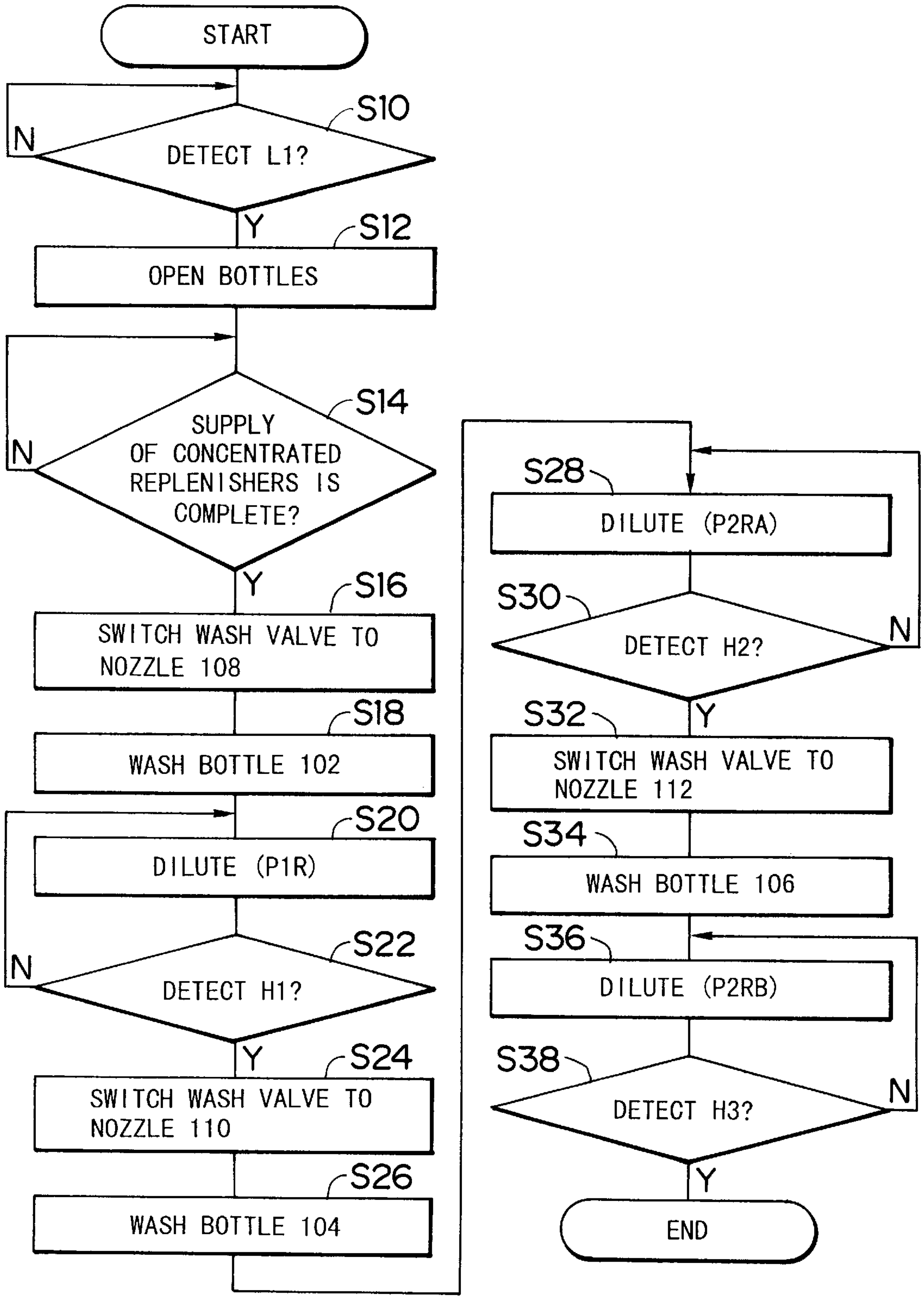
FIG. 6 is a flow chart showing a method of automatically diluting the concentrated replenishers.

In the flow chart of FIG. 6, when the liquid level detector 150 of the replenisher tank 80 detects the lower limit level L1 of the replenisher P1R (S10), the CPU 158 runs the bottle opening drive motor 113 through the driver 160 to automatically open the bottles 102, 104 and 106 in the replenishing agent kit 100 as described with reference to FIG. 3 (S12). Consequently, the concentrated replenishers in the bottles 102, 104 and 106 are supplied to the replenisher tanks 80, 82 and 84 (see FIG. 7(B)).

Then, the CPU 158 determines whether the supply of the concentrated replenishers is completed or not (S14). The determination is based on whether a preset period has passed or not since the bottles 102, 104 and 106 are opened. If the supply of the concentrated replenishers is completed, the CPU 158 washes the bottle 102 and dilutes the concentrated replenisher P1R.

More specifically, the CPU 158 switches the wash valve 120 so that the water PSR can be supplied from the wash pump 122 to the nozzle 108 (S16). Then, the CPU 158 washes the bottle 102 (S18). The water PSR is sprayed from the nozzle 108 for one second, and the spray is stopped for one second. The bottle 102 is washed by repeating this operation ten times.

After the washing, the water PSR is continuously sprayed from the nozzle 108 until the liquid level detector 152 of the replenisher tank 80 detects that the liquid level of the replenisher P1R has reached the upper limit level H1 (S20 and S22). Thus, the concentrated replenisher P1R is diluted. The water PSR used for washing the bottle 102 has been used as a part of the diluting water.

Then, the bottle 104 is washed and the concentrated replenisher P2RA is diluted in the same manner. More specifically, the CPU 158 switches the wash valve 120 so that the water PSR can be supplied from the wash pump 122 to the nozzle 110 (S24) to wash the bottle 104 (S26). Then, the water PSR is continuously sprayed from the nozzle 110 until the liquid level detector 154 of the replenisher tank 82 detects that the liquid level of the replenisher P2RA has reached the upper limit level H2 (S28 and S30). Thus, the concentrated replenisher P2RA is diluted.

Then, the bottle 106 is washed and the concentrated replenisher P2RB is diluted in the same manner. More specifically, the CPU 158 switches the wash valve 120 so that the water PSR can be supplied from the wash pump 122 to the nozzle 112 (S32) to wash the bottle 106 (S34). Then, the water PSR is continuously sprayed from the nozzle 112 until the liquid level detector 156 of the replenisher tank 84 detects that the liquid level of the replenisher P2RB has reached the upper limit level H3 (S36 and S38). Thus, the concentrated replenisher P2RB is diluted.

As stated above, when the liquid level detector 154 of the replenisher tank 82 detects that the liquid level of the replenisher P2RA has reached the upper limit level H2, the dilution of the concentrated replenisher P2RA is finished. When the liquid level detector 156 of the replenisher tank 84 detects that the liquid level of the replenisher P2RB has reached the upper limit level H3, the dilution of the concentrated replenisher P2RB is finished (see FIG. 7(C)).

In this embodiment, the dilution starts when the liquid level detector 150 detects the lower limit level L1 of the replenisher P1R; however, the dilution may also start when a predetermined waiting period has passed since the detection of the lower limit level L1. In this embodiment, the dilution is finished when the liquid level detectors 152, 154 and 156 detect that the liquid levels of the replenishers have reached the upper limit levels H1, H2 and H3. The dilution, however, may also be finished when predetermined waiting periods have passed since the liquid level detectors 152, 154 and 156 detect that the liquid levels of the replenishers have reached the upper limit levels H1, H2 and H3.

FIG. 7(D) shows the state where each of the replenishers P1R, P2RA and P2RB is mixed naturally or by stirring. As shown in FIG. 7(D), the replenisher P2RA with a lower concentration than a desirable value is prepared in the replenisher tank 82, from which a larger amount of the replenisher is supplied. The replenisher P2RB with a higher concentration than the desirable value is prepared in the replenisher tank 84, from which a smaller amount of the replenisher is supplied.

FIG. 7(E) shows the state where the replenishers P1R, P2RA and P2RB, which are prepared as described above, are supplied to the developing tank 68 and the fixing tank 70 again and the liquid level detector 150 of the replenisher tank 80 detects the lower limit level L1 of the replenisher P1R. In short, FIG. 7(E) shows the same state as FIG. 7(A).

As is clear from the comparison between FIG. 7(D) and FIG. 7(E), a large amount of the thinner replenisher P2RA is supplied, and a small amount of the thicker replenisher P2RB is supplied. Consequently, the amount of the agent included in the replenishers supplied to the fixing tank 70 is settled at the desirable value.

In FIG. 3, when the liquid level detector of the replenisher tank 86 detects the lower limit level L4 of the water PSR, water is supplied to the replenisher tank 86 from a hopper 88. Thereafter, when the upper limit level H4 of the water PSR is detected, the supply of the water is stopped.

If the liquid level detector of the safe pan 124 detects the liquid level H5 at the sink 124A, in which the overflow solutions collect; the supply of the solutions or water to the replenisher tanks is stopped. At the same time, at least one of the liquid level detectors for detecting the upper limit levels of the replenisher tanks is determined as going wrong, and a warning of the trouble is displayed or the like. This prevents the excessive dilution of the concentrated replenishers. The safe pan 124 has the liquid level detector as a safe liquid level detector in this embodiment, but the present invention should not be restricted to this. Each of the replenisher tanks may be provided with a safe liquid level detector for detecting a slightly higher liquid level than the upper limit levels H1–H4.

In this embodiment, the replenisher tank 80 has two liquid level detectors for detecting the lower limit level L1 and the upper limit level H1 of the replenisher P1R, but the present invention should not be restricted to this. The replenisher tank 80 may have only one liquid level detector to detect both the lower limit level L1 and the upper limit level H1. More specifically, the electrode switch in FIG. 4 obtains the electric signals corresponding to the liquid level, and thus, a plurality of liquid levels can be detected by setting appropriate thresholds.

In this embodiment, the replenishers P1R, P2RA and P2RB are sequentially prepared in that order, but the present invention should not be restricted to this. The concentrated replenisher automatic diluting apparatus may be constructed in such a manner as to dilute the replenishers P1R, P2RA and P2RB at the same time, and the wash and dilution may be performed by different means.

In this embodiment, only the lower limit level L1 of the replenisher P1R is detected to start the preparation of the replenishers, since the replenisher P1R requires a higher diluting accuracy than the replenishers P2RA and P2RB. The present invention, however, should not be restricted to this. The lower limit levels of all the replenishers P1R, P2RA and P2RB may be detected, and the preparation of the replenishers may be started when the liquid level of the replenisher P1R, P2RA or P2RB reaches the lower limit level.

In this embodiment, the supply of the diluting solution is started after the supply of the concentrated replenishers is completed. The present invention, however, should not be restricted to this. If a period from the start to completion of the supply of the diluting solution is longer than a period from the start to completion of the supply of the concentrated replenishers, the supply of the concentrated replenishers and the diluting solution may be started at the same time. Moreover, to automatically dilute a desired replenisher, a supply of a predetermined amount of the diluting solution may be performed first, and the supply of the diluting solution may be resumed after a predetermined amount of the concentrated replenisher is supplied.

The types of the replenishers should not be restricted to this embodiment. Moreover, the replenishers may be prepared by diluting a mixture of multiple concentrated replenishers. In addition, the containers for the concentrated replenishers are not necessarily the bottles. The concentrated replenishers may be contained in any cartridge, which can contain a predetermined amount of concentrated replenishers in advance.

As set forth hereinabove, the concentrated replenisher automatic diluting apparatus of the present invention accurately and easily dilutes the concentrated replenishers. Moreover, it is made possible to easily adjust the amounts of the agents in the replenishers supplied to the processing tanks to the ideal values in the system for supplying various kinds of replenishers at the same time from the processing agent kit and diluting the concentrated replenishers. Furthermore, the provision of the safe liquid level detector prevents the overflow of a large amount of solutions from the tanks when the regular liquid level detectors go wrong.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A concentrated replenisher automatic diluting apparatus in a photosensitive material processing system, comprising:

a container holding a replenisher supplied to a photosensitive material processing tank;

a first liquid level detector provided in the container to detect that a liquid level of the replenisher held in the container has reached a lower limit level;

a second liquid level detector provided in the container to detect that the liquid level of the replenisher held in the container has reached an upper limit level;

a first supplier which supplies a predetermined amount of concentrated replenisher to the container;

a second supplier which supplies a diluting solution to the container through said first supplier, and which washes said first supplier, wherein diluting solution that is used to wash said first supplier is at least a portion of the diluting solution supplied to the container; and a controller which controls the first and second suppliers;

wherein a supply of the predetermined amount of the concentrated replenisher to the container and a supply of the diluting solution to the container are started in accordance with a detection of the lower limit level of the replenisher held in the container by the first liquid level detector, and the supply of the diluting solution to the container is stopped in accordance with a detection of the upper limit level of the replenisher held in the container by the second liquid level detector.

2. The concentrated replenisher automatic diluting apparatus as defined in claim 1, wherein:

the supply of the predetermined amount of the concentrated replenisher to the container and the supply of the diluting solution to the container are started one of at the detection of the lower limit level of the replenisher held in the container by the first liquid level detector and after a predetermined waiting period from the detection of the lower limit level of the replenisher held in the container by the first liquid level detector; and the supply of the diluting solution to the container is stopped one of at the detection of the upper limit level of the replenisher held in the container by the second liquid level detector and after a predetermined waiting period from the detection of the upper limit level of the replenisher held in the container by the second liquid level detector.

3. The concentrated replenisher automatic diluting apparatus as defined in claim 2, wherein the first and second liquid level detectors are included in one liquid level detecting device.

4. The concentrated replenisher automatic diluting apparatus as defined in claim 3, wherein:

the liquid level detecting device comprises a conductive resin electrode which is constructed in such a way that two parts of two electric wires covered with an insulator are partially exposed as two electrodes, respectively, and the electric wires including the two electrodes are coated with a conductive resin for protecting the two electrodes from the replenisher; and the liquid level detecting device detects the lower and upper limit levels of the replenisher in accordance with an electric current flowing between the two electrodes of the conductive resin electrode.

5. The concentrated replenisher automatic diluting apparatus as defined in claim 2, wherein:

at least one of the first and second liquid level detectors comprises a conductive resin electrode which is constructed in such a way that two parts of two electric wires covered with an insulator are partially exposed as two electrodes, respectively, and the electric wires including the two electrodes are coated with a conductive resin for protecting the two electrodes from the replenisher; and the at least one of the first and second liquid level detectors detects a corresponding one of the lower and upper limit levels of the replenisher in accordance with an electric current flowing between the two electrodes of the conductive resin electrode.

6. The concentrated replenisher automatic diluting apparatus as defined in claim 1, wherein the first and second liquid level detectors are included in one liquid level detecting device.

7. The concentrated replenisher automatic diluting apparatus as defined in claim 6, wherein:

the liquid level detecting device comprises a conductive resin electrode which is constructed in such a way that two parts of two electric wires covered with an insulator are partially exposed as two electrodes, respectively, and the electric wires including the two electrodes are coated with a conductive resin for protecting the two electrodes from the replenisher; and the liquid level detecting device detects the lower and upper limit levels of the replenisher in accordance with an electric current flowing between the two electrodes of the conductive resin electrode.

8. The concentrated replenisher automatic diluting apparatus as defined in claim 1, wherein:

at least one of the first and second liquid level detectors comprises a conductive resin electrode which is constructed in such a way that two parts of two electric wires covered with an insulator are partially exposed as two electrodes, respectively, and the electric wires including the two electrodes are coated with a conductive resin for protecting the two electrodes from the replenisher; and the at least one of the first and second liquid level detectors detects a corresponding one of the lower and upper limit levels of the replenisher in accordance with an electric current flowing between the two electrodes of the conductive resin electrode.

9. The concentrated replenisher automatic diluting apparatus as defined by claim 1, further comprising:

a third liquid level detector provided at a different position from the second liquid level detector;

wherein said controller stops the supply of the diluting solution to the container in accordance with a detection by said third liquid level detector when the second liquid level detector goes wrong.

10. The concentrated replenisher automatic diluting apparatus as defined by claim 9, wherein the third liquid level detector is provided at a part into which overflow from the container collects, and detects a malfunction of the second liquid level detector.

11. A concentrated replenisher automatic diluting apparatus in a photosensitive material processing system, comprising:

a plurality of containers, each of which holds one of a plurality of different kinds of replenishers supplied to a corresponding one of a plurality of photosensitive material processing tanks;

a first liquid level detector provided in at least one of the plurality of containers to detect that a liquid level of the replenisher held in the one of the plurality of containers has reached a lower limit level;

a plurality of second liquid level detectors, each of which is provided in each of the plurality of containers to detect that each liquid level of each replenisher held in each container has reached each upper limit level;

a first supplier which supplies each predetermined amount of each of a plurality of different kinds of concentrated replenishers to each of the plurality of containers;

a second supplier which supplies a diluting solution to each of the plurality of containers; and a controller which controls the first and second suppliers;

wherein each supply of each predetermined amount of each of different kinds of concentrated replenishers to each of the plurality of containers and each supply of the diluting solution to each of the plurality of containers are started in accordance with a detection of the lower limit level of the replenisher held in the one of the plurality of containers by the first liquid level detector, and each supply of the diluting solution to each of the plurality of containers is stopped in accordance with each detection of each upper limit level of each replenisher held in each container by each of the plurality of second liquid level detectors.

12. The concentrated replenisher automatic diluting apparatus as defined in claim 11, wherein:

each supply of each predetermined amount of each of the different kinds of concentrated replenishers to each of the plurality of containers and each supply of the diluting solution to each of the plurality of containers are started one of at the detection of the lower limit level of the replenisher held in the one of the plurality of containers by the first liquid level detector and after a predetermined waiting period from the detection of the lower limit level of the replenisher held in the one of the plurality of containers by the first liquid level detector; and each supply of the diluting solution to each of the plurality of containers is stopped one of at each detection of each upper limit level of each replenisher held in each container by each of the plurality of second liquid level detectors and after a predetermined waiting period from each detection of each upper limit level of each replenisher held in each container by each of the plurality of second liquid level detectors.

13. The concentrated replenisher automatic diluting apparatus as defined in claim 12, wherein the first liquid level detector and one of the plurality of second liquid level detectors provided in the one of the plurality of containers are included in one liquid level detecting device.

14. The concentrated replenisher automatic diluting apparatus as defined in claim 13, wherein:

the liquid level detecting device comprises a conductive resin electrode which is constructed in such a way that two parts of two electric wires covered with an insulator are partially exposed as two electrodes, respectively, and the electric wires including the two electrodes are coated with a conductive resin for protecting the two electrodes from the replenisher; and the liquid level detecting device detects the lower and upper limit levels of the replenisher in accordance with an electric current flowing between the two electrodes of the conductive resin electrode.

15. The concentrated replenisher automatic diluting apparatus as defined in claim 12, wherein:

at least one of the first and second liquid level detectors comprises a conductive resin electrode which is constructed in such a way that two parts of two electric wires covered with an insulator are partially exposed as two electrodes, respectively, and the electric wires including the two electrodes are coated with a conductive resin for protecting the two electrodes from the replenisher; and the at least one of the first and second liquid level detectors detects a corresponding one of the lower and upper limit levels of the replenisher in accordance with an electric current flowing between the two electrodes of the conductive resin electrode.

16. The concentrated replenisher automatic diluting apparatus as defined in claim 11, wherein the first liquid level detector and one of the plurality of second liquid level detectors provided in the one of the plurality of containers are included in one liquid level detecting device.

17. The concentrated replenisher automatic diluting apparatus as defined in claim 16, wherein:

the liquid level detecting device comprises a conductive resin electrode which is constructed in such a way that two parts of two electric wires covered with an insulator are partially exposed as two electrodes, respectively, and the electric wires including the two electrodes are coated with a conductive resin for protecting the two electrodes from the replenisher; and the liquid level detecting device detects the lower and upper limit levels of the replenisher in accordance with an electric current flowing between the two electrodes of the conductive resin electrode.

18. The concentrated replenisher automatic diluting apparatus as defined in claim 11, wherein:

at least one of the first and second liquid level detectors comprises a conductive resin electrode which is constructed in such a way that two parts of two electric wires covered with an insulator are partially exposed as two electrodes, respectively, and the electric wires including the two electrodes are coated with a conductive resin for protecting the two electrodes from the replenisher; and the at least one of the first and second liquid level detectors detects a corresponding one of the lower and upper limit levels of the replenisher in accordance with an electric current flowing between the two electrodes of the conductive resin electrode.

19. The concentrated replenisher automatic diluting, apparatus as defined by claim 11, further comprising:

at least one third liquid level detector provided at a different position from the plurality of second liquid level detectors;

wherein said controller stops each supply of the diluting solution to the containers in accordance with a detection by said at least one third liquid level detector when at least one of the plurality of second liquid level detectors goes wrong.

20. The concentrated replenisher automatic diluting apparatus as defined by claim 19, wherein the third liquid level detector is provided at a part into which overflow from the plurality of containers collects, and detects a malfunction of at least one of the plurality of second liquid level detectors.

21. A concentrated replenisher automatic diluting method, comprising the steps of:

detecting that a liquid level of a replenisher held in a container has reached a lower limit level;

supplying a predetermined amount of a concentrated replenisher from a concentrated replenisher cartridge to the container when the liquid level is detected as being the lower limit level;

starting a supply of a diluting solution to the container through the concentrated replenisher cartridge when the liquid level is detected as being the lower limit level, wherein at least a portion of the diluting solution washes the concentrated replenisher cartridge;

detecting that the liquid level of the replenisher held in the container has reached an upper limit level; and stopping the supply of the diluting solution when the liquid level is detected as being the upper limit level;

wherein the replenisher is supplied to a photosensitive material processing tank in a photosensitive material processing system.

22. The concentrated replenisher automatic diluting method as defined in claim 21, wherein the starting step is executed after the supplying step is completed.

23. The concentrated replenisher automatic diluting method as defined in claim 21, wherein if a period from a start to a completion of the supply of the diluting solution is longer than a period from a start to a completion of the supply of the predetermined amount of the concentrated replenisher, the supply of the diluting solution and the supply of the concentrated replenisher are started at the same time.

24. The concentrated replenisher automatic diluting method as defined in claim 21, wherein:

the starting step is executed prior to the supplying step;

the supply of the diluting solution is suspended after a predetermined amount of the diluting solution is supplied, and then the supplying step is executed; and the supply of the diluting solution is resumed after the supplying step is completed.

25. The concentrated replenisher automatic diluting method as defined by claim 21, further comprising:

detecting a malfunction by detecting that the liquid level of the replenisher held in the container has exceeded the upper limit level;

stopping the supply of the supply of diluting solution when the liquid level is detected as exceeding the upper limit level.

26. The concentrated replenisher automatic diluting method as defined by claim 25, wherein the detecting that the liquid level of the replenisher held in the container has exceeded the upper limit level comprises detecting overflow from the container.

27. A concentrated replenisher automatic diluting method, comprising the steps of:

detecting that at least one of liquid levels of a plurality of different kinds of replenishers held in a plurality of containers has reached a lower limit level;

supplying each predetermined amount of each of a plurality of different kinds of concentrated replenishers from each of concentrated replenisher cartridges to each of the plurality of containers when the at least one of liquid levels is detected as being the lower limit level;

starting each supply of a diluting solution to each of the plurality of containers when the at least one of liquid levels is detected as being the lower limit level;

detecting that each liquid level of each replenisher held in each container has reached each upper limit level; and stopping each supply of the diluting solution to each of the plurality of containers when each liquid level is detected as being each upper limit level;

wherein each of the replenishers is supplied to a corresponding one of a plurality of photosensitive material processing tanks in a photosensitive material processing system.

28. The concentrated replenisher automatic diluting method as defined in claim 27, wherein only the liquid level of the replenisher that requires the highest diluting accuracy among the different kinds of replenishers is detected in the former detecting step.

29. The concentrated replenisher automatic diluting method as defined in claim 27, wherein the liquid level of the replenisher that has reached the lower limit level first among the different kinds of replenishers is detected in the former detecting step.

30. The concentrated replenisher automatic diluting method as defined in claim 27, wherein the starting step is executed after the supplying step is completed.

31. The concentrated replenisher automatic diluting method as defined in claim 27, wherein if each period from each start to each completion of each supply of the diluting solution is longer than each period from each start to each completion of each supply of each predetermined amount of each concentrated replenisher, each supply of the diluting solution and each supply of each concentrated replenisher are started at the same time.

32. The concentrated replenisher automatic diluting method as defined in claim 27, wherein:

the starting step is executed prior to the supplying step;

each supply of the diluting solution is suspended after each predetermined amount of the diluting solution is supplied, and then the supplying step is executed; and each supply of the diluting solution is resumed after the supplying step is completed.

33. A concentrated replenisher automatic diluting method, comprising the steps of:

detecting that at least one of liquid levels of a plurality of different kinds of replenishers held in a plurality of containers has reached a lower limit level;

starting each supply of a diluting solution to each of the plurality of containers when the at least one of liquid levels is detected as being the lower limit level;

detecting that each liquid level of each replenisher held in each container has reached each upper limit level;

stopping each supply of the diluting solution to each of the plurality of containers when each liquid level is detected as being each upper limit level; and supplying each predetermined amount of each of a plurality of different kinds of concentrated replenishers from each of concentrated replenisher cartridges to each of the plurality of containers after the stopping step;

wherein each of the replenishers is supplied to corresponding one of a plurality of photosensitive material processing tanks in a photosensitive material processing system.

34. The concentrated replenisher automatic diluting method as defined in claim 33, wherein only the liquid level of the replenisher that requires the highest diluting accuracy among the different kinds of replenishers is detected in the former detecting step.

35. The concentrated replenisher automatic diluting method as defined in claim 33, wherein the liquid level of the replenisher that has reached the lower limit level first among the different kinds of replenishers is detected in the former detecting step.

36. A liquid level detecting device which detects that a level of liquid held in a container has reached first and second levels, said device comprising:

a core conductor;

a first insulator, coaxially insulating a portion of said core conductor, wherein an end of said core conductor is exposed as a first electrode at the first level;

a metal shield tube, coaxially surrounding a portion of said first insulator;

a second insulator, coaxially insulating a portion of said metal shield tube, wherein an end of said metal shield tube is exposed at a predetermined distance from the first electrode to form a second electrode at the second level;

a conductive resin, coating an exposed surface of said core conductor, said first insulator, said metal shield tube, and said second insulator, forming an electrical connection of predetermined resistance between the first and second electrodes; and a liquid level detector, detecting the level of the liquid by measuring current flow between the first and second electrodes, wherein the level of the liquid between the first and second electrodes decreases electrical resistance below the predetermined resistance by an amount corresponding to the level of the liquid, wherein:

the level of the liquid is determined to be at most at a lower one of the first and second levels when the electrical resistance between the first and second electrodes corresponds to the predetermined resistance of said conductive resin; and the level of the liquid is determined to be at a higher one of the first and second levels when the electrical resistance between the first and second electrodes stops decreasing, indicating a maximum current flow.

* * * * *